April 22, 1924.
C. M. FRYKMAN
SOLDERING IRON
Filed July 11, 1921.
1,491,389
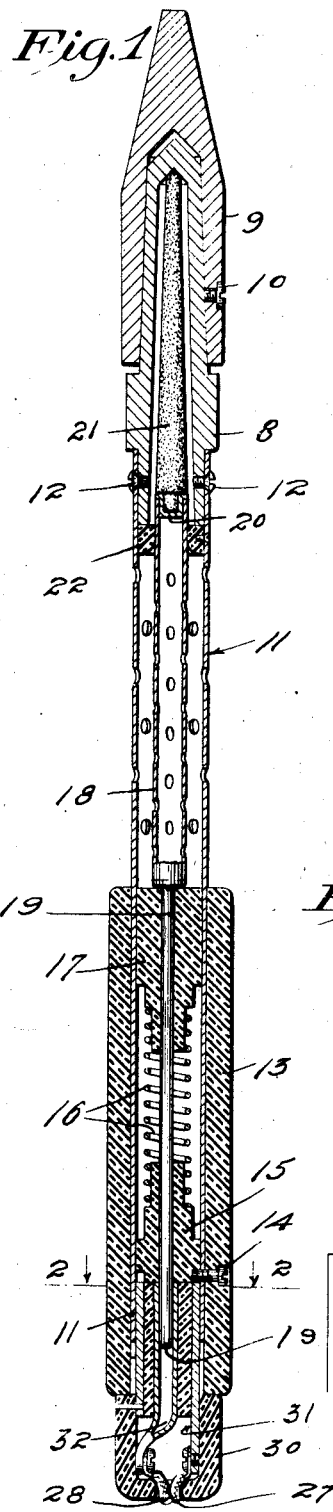
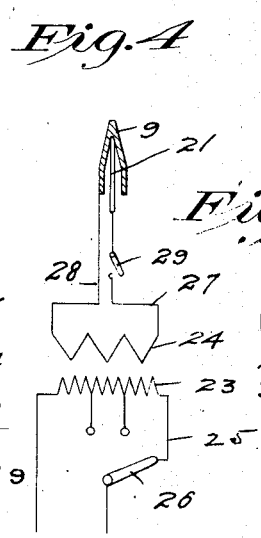
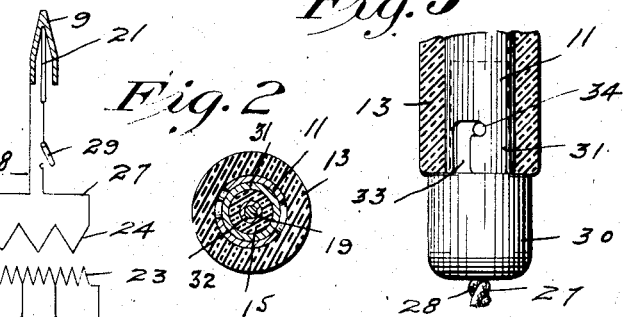
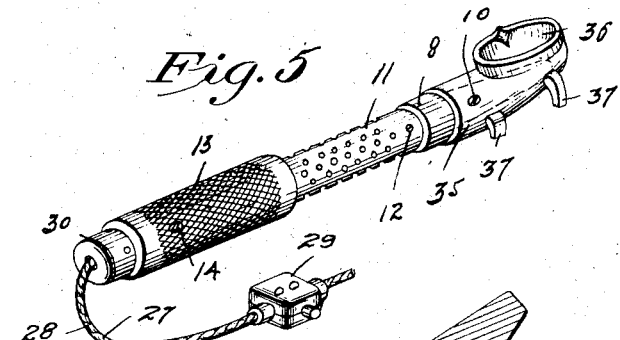
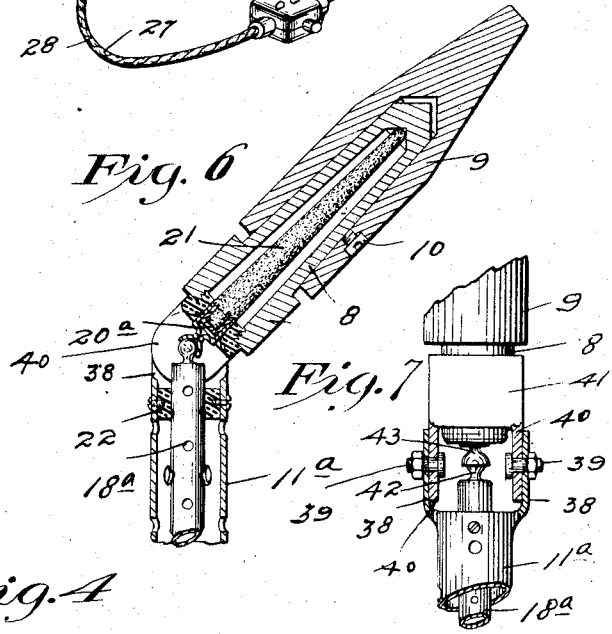
Inventor
Carl M. Frykman
By his Attorneys
Michael Kilgour Kilgore Patented Apr. 22, 1924.

1,491,389

UNITED STATES PATENT OFFICE.

CARL M. FRYKMAN, OF MINNEAPOLIS, MINNESOTA.

SOLDERING IRON.

Application filed July 11, 1921. Serial No. 484,010.

*To all whom it may concern:*

Be it known that I, CARL M. FRYKMAN, a citizen of the United States, residing at Minneapolis, in the county of Hennepin and State of Minnesota, have invented certain new and useful Improvements in Soldering Irons; and I do hereby declare the following to be a full, clear, and exact description of the invention, such as will enable others skilled in the art to which it appertains to make and use the same.

My invention relates particularly to electrical soldering irons but is capable of a larger range of usage, as may be obvious or will hereinafter appear. Generally stated, the invention consists of the novel construction, arrangement and combination of parts hereinafter described and defined in the claims.

My invention improves the construction of electrical soldering irons and similar electrical heating devices by the elimination of heating coils and all sparking actions such as produced between separated electrodes. This is accomplished by the use of a simple high-resistance electrode, preferably a straight or core-like carbon electrode placed in electrical contact with the interior of a hollow heat applying element. Such high-resistance electrode when made of carbon may have considerable cross-section and still offer greater electrical resistance than any other part of the current-supplying circuit. In addition to the features above indicated the invention involves other highly important features, as will hereinafter appear.

In the accompanying drawings, which illustrate the invention, like characters indicate like parts throughout the several views.

Referring to the drawings:

Fig. 1 is an axial section illustrating my invention as incorporated in such soldering iron;

Fig. 2 is a section taken on line 2—2 of Fig. 1;

Fig. 3 is a fragmentary view, partly in plan and partly in section, showing the separable interlocking connection between the stem of the soldering iron and the contact plug of the supply in the circuit;

Fig. 4 is a diagrammatic view illustrating the circuit connections that may be used in the construction of Figures 1, 2 and 3:

Fig. 5 is a perspective view showing the soldering iron illustrated in Fig. 1 with the "point" of the soldering iron removed and with the heating receptacle applied in lieu of the displaced point:

Fig. 6 is an axial section showing a preferred form of the soldering iron in which the point is pivotally connected to the stem; and Fig. 7 is a side elevation of the parts shown in Fig. 6, some parts being broken away and some being sectioned.

The construction illustrated in Figures 1 to 4, inclusive, may first be described. In this arrangement, the heat applying element is made up of two separable parts 8 and 9, both of which are preferably of copper. The member 8 is in the form of a hollow shank with a tapered exterior and with a closed and preferably pointed end. The member 9 is the "point" proper and is formed with a socket that fits the tapered exterior of the shank 8 and is rigidly but detachably secured thereto by a set screw 10.

The reduced inner end of the shank 8 is telescoped into a tubular outer stem 11 and is rigidly secured thereto by screws 12. The stem 11 at its other end is telescoped into a sleeve-like handle 13 and is rigidly secured thereto by a set screw 14. The projecting end of the screw 14 holds in place a tubular abutment 15 that is made of insulating material and fits within the stem 11 at its reduced end around which one end of the coil spring 16 is placed. The other end of this coil spring is placed around a sliding abutment 17 which is also of insulating material but is telescopic and movable within the stem 11.

The numeral 18 indicates an electrical conductor, preferably of tubular form and which is provided with a reduced stem or rod 19, placed axially through a movable abutment 17 and a fixed abutment 15, and projects below or beyond the latter for a purpose which will presently appear. Preferably the tubular stem 11 and the tubular conductor 18 are both perforated so that air circulating therethrough will have a cooling effect thereon. At its outer end the tubular conductor 18 has a socket 20 that receives the reduced end of a heat producing element 21, preferably of carbon and of such high electrical resistance that it will be heated to a high degree of temperature by electrical current passed therethrough. In fact, this carbon heating element acts as an electrode which has a higher electrical resistance than any other part of the electrical heating circuit. Preferably the electrode 21 is tapered and progressively reduced in cross-section from its inner toward its outer end; and at its outer end it fits with close contact against the head or closed end of shank 8. The purpose of tapering the electrode 21 is to increase its electrical resistance towards its outer end or that end that is in contact with the shank or other heat applying element, so that the said electrode will have its hottest portion at or toward the outer portion of a tip or heat applying portion of the soldering iron or similar device.

The spring 16 exerts a yielding force which will compensate for expansion and contraction and burning away of the electrode 21, and will always keep said electrode in close electrical contact with the tip or heat applying element. Numeral 22 indicates a bushing placed in the outer end of the metallic stem 11 and through which the tubular conductor 18 is capable of moving.

The device may be supplied either with alternating or direct current for heating purposes but in Fig. 4 there is illustrated an arrangement for supplying alternating current through a "step-down transformer" consisting of a primary coil 23 and a secondary coil 24. The primary coil 23 is in a supply circuit 25 shown as equipped with a switch 26. The secondary coil 24 is in a secondary circuit which, as will hereinafter more clearly appear, includes the rod 19 to the conductor 18, electrode 21, shank 8 and tubular metallic stem 11. As shown, the secondary coil 24 has leads 27 and 28, the switch 29 being placed in lead 27.

The numeral 30 indicates a plug of insulating material provided with an outer tubular contact 31 and an inner tubular contact 32, which contacts are connected respectively with the leads 27 and 28, but insulated from each other. When the electrical connection is made, the outer tubular contact 31 is telescoped with frictional engagement into the end of the tubular stem 11 and tubular contact 32 is telescoped with frictional contact onto the projecting end of rod 19. As shown in Fig. 3, the tubular contact 31 has an L-shaped slot 33 that cooperates with a pin 34 on the interior of the stem 11 to afford a bayonet joint for securing plug 30 and its contacts in operative engagement with the soldering iron.

With the arrangement described the heating circuit may be broken by opening the switch 26 or the switch 29 or by removing the plug from the soldering iron.

The device illustrated in Fig. 5 is that illustrated in Figures 1 to 4, inclusive, but with the tip proper 9 removed and with the substituted socket-like member 35 applied to the shank 8. As shown, this substituted member 35 has a small bowl 36 adapted to hold soldering material or the like which may be melted therein, and also, as shown, said member 35 has supporting legs 37, adapting it to be seated on a flat support.

In the modified construction illustrated in Figures 6 and 7, the tip end of the soldering iron is pivotally connected to the stem or body so that it may be turned to angular positions in respect thereto, as, for example, shown in Fig. 6. For this modified arrangement the tubular stem 11$^a$, which corresponds to the stem 11, is formed with laterally spaced ears 38, which are pivotally connected by small bolts 39 to ears 40 formed on the short supplemental stem section 41, which is rigidly secured on the reduced end of the shank 8. Also in this arrangement the tubular conductor 18$^a$, which corresponds to the tubular conductor 18, in line with the pivot 39, is provided with a spherical head 42 which contacts with a semispherical socket 43, secured to an electrically connected wire and socket 20$^a$, in which latter the carbon electrode 21 is telescoped. Otherwise than as described the construction illustrated in Figures 6 and 7 may be like that illustrated in Figures 1 to 4, inclusive.

For many purposes the tip members 8 and 9 might be made integral but by forming the same in two parts one of which is detachable, it is made feasible to use any one of many different kinds of detachable and interchangeable heat applying elements. Also, from what has been said, it will be understood that the device described is capable of modification in its construction and is capable of different uses and all within the scope of my invention, as herein described and claimed.

The so-called core-like electrode, which is located within the hollow shank of the heat-applying element, is not a coiled wire but a body of considerable cross section of a material such as carbon that has high electrical resistance, but said so-called core may have one or more legs or branches, which, however, will be in a closed circuit when in action so that a sparking action will not be produced within the shank or bore of the heat-applying element.

What I claim is:

1. An electrical heating device comprising a heat-applying element, and a core-like high-resistance electrode held in electrical contact with said heat-applying element, said electrode having decreasing cross section in a direction toward its point of contact with said heat-applying element.

2. An electrical heating device comprising a heat-applying element, and a core-like high-resistance electrode held in electrical contact with said heat-applying element, said heat-applying element having a detachable portion.

3. An electrical heating device comprising a heat-applying element, and a core-like high-resistance electrode held in electrical contact with said heat-applying element, said heat-applying element comprising a relatively fixed shank and a co-operating detachable portion telescopically fitting on said shank.

4. An electrical heating device comprising a tubular stem, a head pivotally connected to said stem, an electrical heating electrode within said head, and an electrical conductor extended through said stem and connected to said electrode by a pivot joint that is aligned with the pivotal connection between said stem and head.

5. An electrical heating device comprising a heat-applying head including an electrode, an insulating handle, concentric tubular stem-forming members connecting said handle and head, and an electrical circuit including said tubular members and said electrode, said tubular members being perforated for the circulation of air therethrough to keep said tubular members at a relatively low temperature.

In testimony whereof I affix my signature.

CARL M. FRYKMAN.